J. P. STEWART & J. R. CHILDS.
LOCK FOR BOXES.
APPLICATION FILED MAY 2, 1917.

1,271,096.

Patented July 2, 1918.

Inventors
J. P. Stewart
J. R. Childs

By A. M. Wilson
Attorney

UNITED STATES PATENT OFFICE.

JOHN P. STEWART AND JAMES R. CHILDS, OF KANSAS CITY, MISSOURI.

LOCK FOR BOXES.

1,271,096.

Specification of Letters Patent.

Patented July 2, 1918.

Application filed May 2, 1917. Serial No. 165,876.

*To all whom it may concern:*

Be it known that we, JOHN P. STEWART and JAMES R. CHILDS, citizens of the United States, residing at Kansas City, in the county of Jackson and State of Missouri, have invented certain new and useful Improvements in Locks for Boxes, of which the following is a specification.

An object of the present invention is to provide a lock for the box of an identification device and means for securing the box and lock to the instrument board of an automobile whereby the lock and attaching means are hidden from view when in use.

With this general object in view and others that will appear as the nature of the invention is better understood, the same consists in the novel construction, combination and arrangement of parts hereinafter more fully described, illustrated in the accompanying drawings, and then claimed.

In the drawing forming a part of this application and in which like designating characters refer to corresponding parts throughout the several views:—

Figure 1:
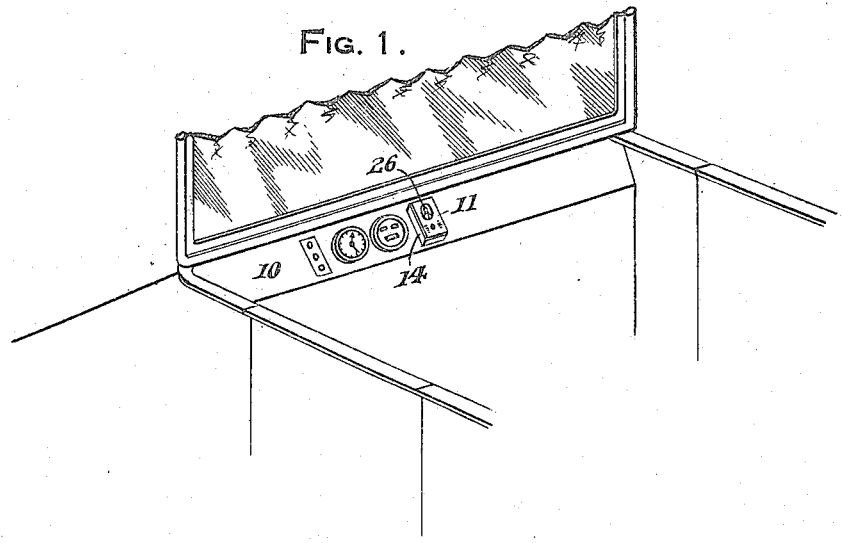
Figure 1 is a perspective view of a portion of an automobile with an identification device attached thereto.

Briefly described, the present invention aims to provide a lock for the box of such identification devices which are especially adapted and constructed for attachment to automobiles, more particularly to the instrument boards thereof, as shown in Fig. 1. These identification devices contain complete information relative to the automobile, such as the model number, year of make, the name of the car, style, car number, engine number, license number, as well as information concerning the owner of the automobile, and the present invention provides means wherein it is impossible without a special form of key to gain access to the interior of the box of the identification device. The lock and means for attaching the lock and box of the device to the instrument board are hidden from view and this makes it more difficult to gain access to the interior of the box, or to remove the same. As illustrated, the identification device is in the form of a box or receptacle that is adapted for permanent connection with an automobile and has a removable cover, there being provided an opening in the cover in which may be inserted a photograph of the automobile owner and upon which photograph may be contained information as outlined above, it being understood that a backing plate is positioned beneath the opening and a front glass covers the information sheet contained therein.

Figure 2:
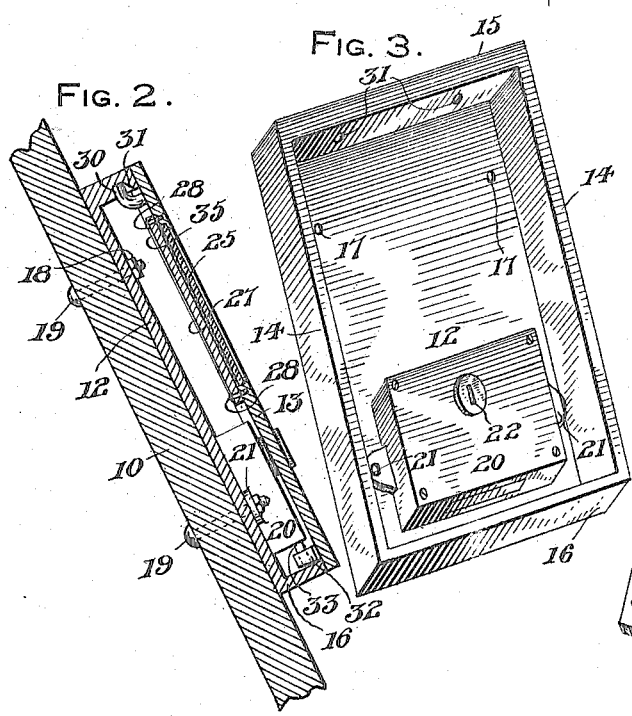
Fig. 2 is a cross-sectional view of a portion of the instrument board shown in Fig. 1 and also showing in section, an identification device provided with the present invention and attached to said instrument board.
Figure 3:
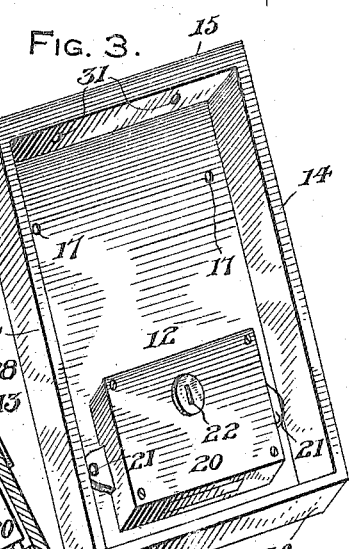
Fig. 3 is a perspective view of the box or receptacle portion of the identification device attached from the instrument board.
Figure 4:
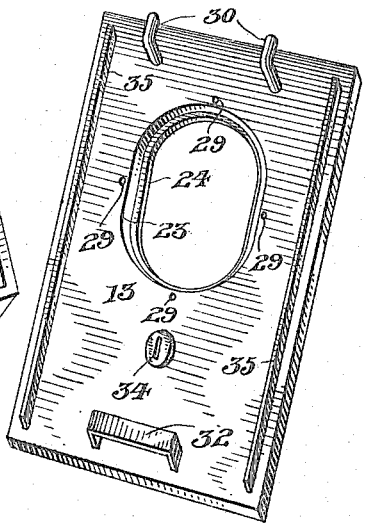
Fig. 4 is an inverted perspective view of the cover of the identification device box showing the side flanges for preventing lateral movement of the cover.

Referring more in detail to the accompanying drawing, the reference numeral 10 designates the instrument board of an automobile having suitable instruments mounted thereon, such as a speedometer, clock and switches as indicated in Fig. 1, as well as having connected thereto the identification device 11 shown in detail in Figs. 2 to 4. The identification device includes a box-like receptacle having a box 12 and a removable cover 13, the box 12 having side walls 14 and end walls 15 and 16. As shown in Fig. 2, the box 12 of the device is connected to the instrument board 10 as by threaded bolts having plain heads passed through the instrument board from the under side with the threaded ends thereof entering the openings 17 provided in the bottom of the body-portion with securing nuts 18 upon the threaded ends of the bolts 19 and positioned within the body-portion for retaining the bolts in position and locking the identification device to the instrument board.

A lock casing 20 containing lock mechanism of any suitable type including a key-operated sliding bolt is secured upon the bottom of the box 12 adjacent the lower end thereof and spaced substantially an equal distance from the end walls 16 and side walls 14. The lock casing 20 may be secured to the bottom by suitable fastening devices, and in addition thereto is secured by the side lugs 21 having openings registering with the openings 17 and through which the retaining bolts 19 are passed and retained by the nuts 18. A key opening 22 is formed in the upper wall of the casing 20 for the reception of the operating key for the bolt, The cover 13 of the box has an opening 23 formed therein adjacent one end and surrounded by an inwardly directed flange 24 which forms a seat for the reception of the glass closure 25 shown in Fig. 2, and upon which glass closure, the identification card 26 is adapted to be positioned and so retained by a backing plate 27 secured upon the inner wall of the casing by fastening devices 28 passed therethrough and entering the openings 29 in the cover 13. The cover 13 is retained in position on the box 12 by angle lugs or pins 30 depending from the cover 13 and adapted for reception in sockets 31 formed in the inner face of the end wall 15 while the opposite end of the cover 13 carries a loop keeper 32 adapted when operatively positioned as shown in Fig. 2, to aline with the sliding bolt 33 of the lock 20. By reference to Fig. 2 it will be seen that the angle pins 30 and the bolt 33 passed in the keeper 32 will effectively prevent the removal of the cover from the box. A key opening 34 is provided in the cover 13 and when assembled as shown in Fig. 2, the key openings 22 and 34 register so that upon insertion of the proper key, the lock mechanism within the casing 20 may be operated to cause the withdrawal of the bolt 33 from the loop keeper 32, and at which time the lower end of the cover 13 may be swung outwardly to permit the releasing of the angle pins 30 from the sockets 31. In order to prevent lateral movement of the cover 13 upon the box 12, there are provided depending flanges 35 that engage the inner faces of the side walls 14 of the box and by such construction, the lid 13 is effectively held in position.

While the form of the invention herein shown and described is what is believed to be the preferred embodiment thereof, it is nevertheless to be understood that various forms, modifications and arrangements of the parts may be made without departing from the spirit and scope of the invention as claimed.

What we claim as new is:—

A device of the class described including a box, a lock having apertured ears and arranged within and resting upon the bottom of said box, said lock being provided with a keyhole in the top wall thereof, means extending through said ears and the bottom of the box for securing said lock within said box and for securing the box to a support, a cover for said box having a keyhole therethrough coincident with the keyhole of said lock, and means including said lock for securing the cover on said box.

In testimony whereof we affix our signatures.

JOHN P. STEWART.
JAMES R. CHILDS.

Copies of this patent may be obtained for five cents each, by addressing the "Commissioner of Patents, Washington, D. C."